UNITED STATES PATENT OFFICE.

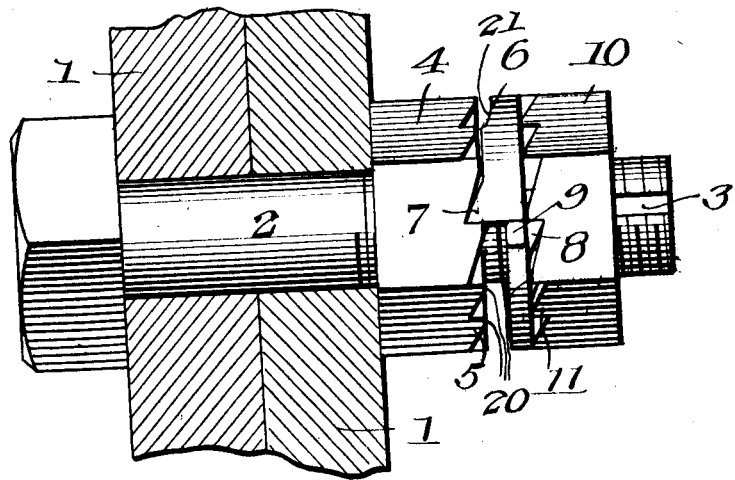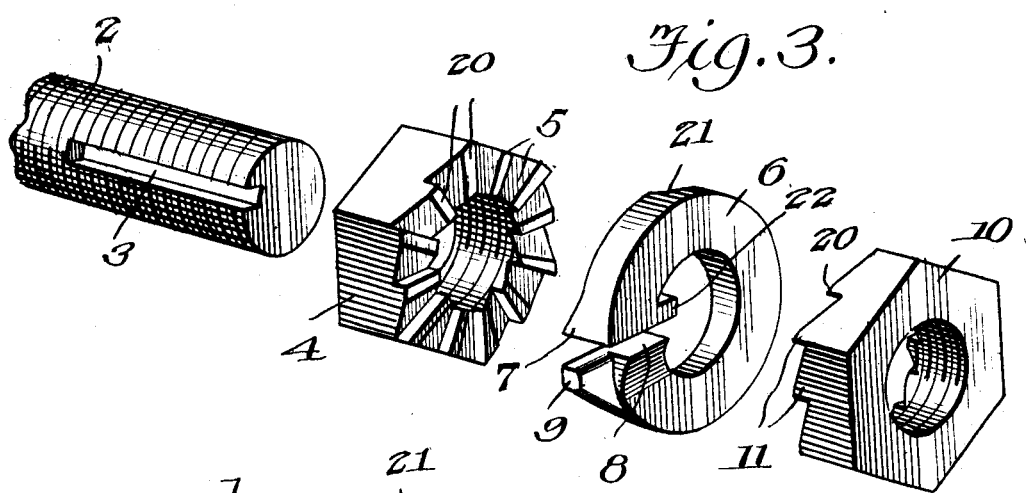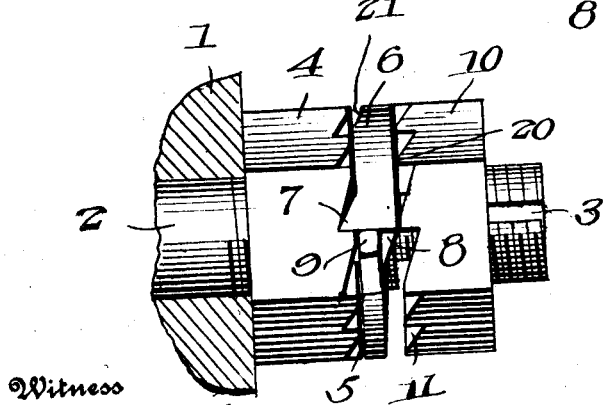

MICHAEL A. THOMSHAW, OF WEST WYOMING, PENNSYLVANIA.

NUT-LOCK.

1,176,621.  Specification of Letters Patent.  Patented Mar. 21, 1916.

Application filed October 29, 1915. Serial No. 58,642.

*To all whom it may concern:*

Be it known that I, MICHAEL A. THOMSHAW, a citizen of the United States, residing at West Wyoming, in the county of Luzerne and State of Pennsylvania, have invented new and useful Improvements in Nut-Locks, of which the following is a specification.

The present invention relates to improvements in means for locking a nut upon a bolt.

An object of the invention is to provide a nut lock which will effectively sustain both a nut and bolt against accidental displacement, but which also permits of the separation of the nut from the bolt when desired.

A further object of the invention is to provide a bolt with a groove, to arrange upon the said bolt both a holding nut and a binding nut, the adjacent faces of which being toothed and to arrange upon the said bolts, between the said nuts, a lock in the nature of a split spring ring, the ends of which being formed with dogs which engage with the toothed faces of the respective nuts said ring being further provided with a lug which is received in the groove of the bolt, the ring, from one of its ends being gradually decreased in thickness, so that its thin end may be sprung toward one of the nuts to bring the dog carried by the said end out of engagement with the teeth of the other nut, and so permit of the ready separation of the locking elements.

With the above and other objects in view, the improvement resides in the construction, combination and arrangement of parts set forth in the following specification and falling within the scope of the appended claims.

In the drawing: Figure 1 is a vertical longitudinal view through plates connected by a bolt having nuts locked thereon in accordance with the present invention, Fig. 2 is a view illustrating the manner of operating the lock to permit of the unscrewing of the nuts and the removal of the lock from the bolt, Fig. 3 is a perspective view of the bolt, nuts and washers as they appear before being brought together.

In the drawing, the numeral 1 designates plates through which pass a connecting bolt 2. The threaded shank of this bolt is formed with a longitudinally extending groove 3, and threaded upon the said shank and contacting with one of the plates is a nut 4. This nut has its outer face provided with teeth 5 which radiate from the axial bore of the nut, the said teeth including straight shoulders and inclined walls for connecting the said shoulders. Arranged upon the shank of the bolt which projects beyond the outer face of the nut 4 is my improved split spring locking ring or washer 6 which has its ends exerting an outward tension in opposite directions. One of the ends of the lock member 6 is provided with an inturned extension forming the same with a dog 7 which is shaped to agree with the shape of the teeth 5 and to engage with one of the said teeth. This dog is extended inwardly in the bore of the ring and received in the groove 3 of the bolt 2. The inner face of the washer or the face thereof provided with a dog 7 gradually decreases in width to the opposite end of said washer, so that the second ring is of a width at least one-half or less than the thickness of the first mentioned end, and the last mentioned end is provided with a lateral extension projecting outwardly therefrom to provide a dog 8, the said dog being extended outwardly to form this end of the lock ring with a lever 9. The locking ring 6, at its end provided with the dog 7, has an integral inwardly extending lug 22 which is adapted to be received in the groove 3 of the bolt. When the lock ring is thus positioned a binding or lock nut 10 is screwed upon the extending shank of the bolt, and the inner face of this nut 10 is formed with teeth 11, the said teeth radiating from the axial bore of the nut and comprises straight shoulders and angular walls connecting the shoulders. When screwing the nut 10 upon the bolt, the teeth thereof will ratchet over the dog 8 until the same contacts with the thickened end of the washer when the reduced spring end of the ring washer provided with the said dog 8 exerts an outward tension to bring the dog into engagement with one of the teeth 11 of the lock nut and thus effectively sustain both the nut 4 and the lock nut 10 securely upon the bolt. It will further be noted that the extension of the dog 7 being received in the groove 3 of the bolt, the said bolt cannot turn independently or in other words the turning of the bolt will likewise result in the turning of the nuts of the locking element upon the bolt.

To separate the elements comprising the lock a tension is exerted upon the projecting lever 9, forcing the dog 8 out of engagement with the teeth 11 of the lock nut, the reduced end of the lock ring permitting the said dog to be brought entirely out of engagement with the said teeth of the lock nut without interfering with the remainder of the device. When the lock nut 10 is unscrewed the lock washer or ring may be moved longitudinally upon the bolt, and thereafter the nut 4 may be unscrewed. By reference to the drawing it will be seen that the teeth 5 and 11 of the nut members 4 and 10 respectively, have their outer edges flattened, as at 20, so that the said edges will not bite or bind against the locking ring or washer 6 to interfere with the free operation of the parts when moved to either a locking or unlocking position. It will be further noted that the ring or washer 6, at a desirable distance from the dog 7 has one of its faces scalloped or otherwise provided with a depression 21 which adds to the resiliency of the said member 6, and also that the lug or lever 9 is of a width approximately equaling the width of the ring or washer at the reduced end thereof, and what may be termed the outer edge of said member 9 is beveled from its end to its juncture with the washer, thus adding to the strength and stability of the said member 9.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. The combination, a bolt having its shank provided with a groove, a nut screwed upon the bolt, said nut having its outer face provided with teeth, a split spring locking ring slit upon the bolt, said ring having one of its ends provided with a lateral member forming a dog which engages with one of the teeth of the nut, the base of the ring provided with the said dog gradually decreasing in thickness to the opposite end of the said dog so that the reduced end of the dog is of a thickness approximately equaling one-half of the thickness of the first mentioned ring, the dog of the thickened end being projected inwardly and received in the groove of the bolt, the reduced end having a laterally extending portion forming a dog and an outwardly extending portion integral with the dog and providing a lever, a lock nut screwed upon the bolt, and said lock nut having its inner face formed with teeth one of which adapted to be engaged by the dog and reduced end of the lock member, all as and for the purpose specified.

2. The combination, a grooved bolt, a nut for the bolt having one of its faces toothed and the edges of the teeth flattened, a slit locking ring having its ends provided with oppositely extending lugs, one of which engaging between the teeth of the nut, said ring having one of its faces at a distance from one of the dogs formed with a circumferential depression, and the said ring, at one of its ends being provided with an outward extension of a width approximately equaling the portion of the ring upon which it is formed, the ring at one of its ends having an inturned lug received in the groove of the bolt, a lock nut screwed on the bolt and having its inner face toothed and the ends of the teeth flattened and contacting with one of the faces of the ring to bring the dog upon the said face of the ring between two of the teeth of the lock nut, as and for the purpose set forth.

In testimony whereof I affix my signature in presence of two witnesses.

MICHAEL A. THOMSHAW.

Witnesses:
 WILLIAM J. SPACE,
 JOHN TOWNSEND.